(No Model.)

F. DRIFFILL.
RUNNER FOR WHEELED VEHICLES.

No. 398,385. Patented Feb. 26, 1889.

Fig. 2.a.

WITNESSES.
Edwin L. Yewell,
Marcus B. May.

INVENTOR.
Frederick Driffill.
John G. Manahan,
Attorney.

UNITED STATES PATENT OFFICE.

FREDERICK DRIFFILL, OF STERLING, ASSIGNOR TO THE EUREKA COMPANY, OF ROCK FALLS, ILLINOIS.

RUNNER FOR WHEELED VEHICLES.

SPECIFICATION forming part of Letters Patent No. 398,385, dated February 26, 1889.

Application filed October 18, 1888. Serial No. 288,520. (No model.)

*To all whom it may concern:*

Be it known that I, FREDERICK DRIFFILL, a citizen of the United States, residing at Sterling, in the county of Whiteside and State of Illinois, have invented certain new and useful Improvements in Runner Attachments to Wheel Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in improvements in runner attachments to wheeled vehicles, by means of which the said vehicle may be readily converted into a sled or sleigh for use in the latter capacity during the winter season.

My improvement consists, essentially, in a novel method of attaching each runner to the vehicle-axle at any point upon the latter, so as to adjust the tread of the sled or sleigh to such width as may be desired, and also in providing two separate bearings for the axle upon each runner, each of said bearings being of a pivotal character, so as to permit the independent vertical oscillation of each runner, and in the special form of the runner.

My invention is applicable generally to all species of wheeled conveyances, and inasmuch as the mode of attaching it is substantially the same in every instance, I do not deem it necessary to show or describe the same further than in its application to one species of vehicle.

Figure 1:
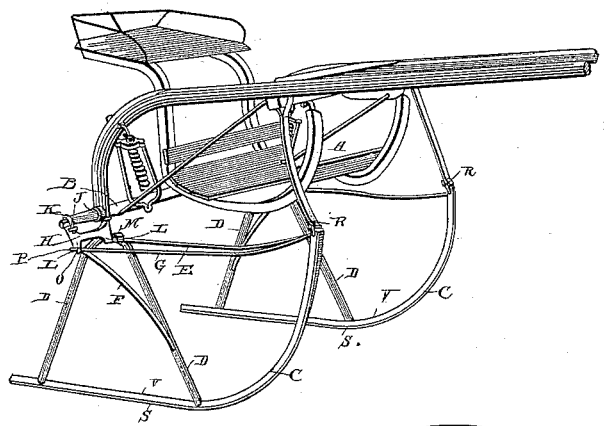
Figure 2:
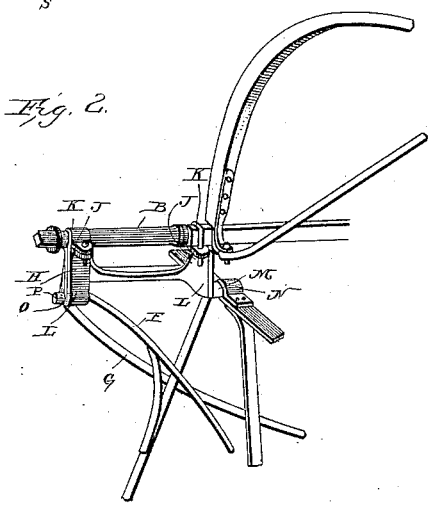
Figure 2:
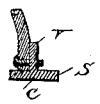

In the drawings, Figure 1 is a perspective of a portion of a road-cart provided with my invention. Fig. 2 is a detail of the point of junction between the axle and runners, showing the parts involved in securing the attachment to the runners of said axle; and Fig. 2ª is a cross-section on the line *x x* of Fig. 1 of one of the runners C.

A is the body of the vehicle, which may be of any of the well-known forms; and B, the axle thereof.

C C are runners, having the usual upwardly-bent front ends, and are constructed of steel, consisting of the tread S and central upwardly-extending flange, V.

As the parts in the construction of the attachment to each runner are the same, I will describe only those concerned in the attachment of one runner, it being understood, of course, that in a four-wheeled vehicle four runners will be required.

D D are the bench-rods, attached at their lower ends to the flange V of runners C, and rest upon the upper side of the tread S.

E is the rail, suitably attached at its front end near the top of the runner C, and extending to the rear about the same distance as said runner.

F is a brace-rod, attached at its lower end to one of the bench-rods D, and extending diagonally outward and upward, and attached at its upper and outer end to the rear end of a second diagonal rail, G, the front of which is suitably attached at or near the forward end of the rail E.

H is a metallic frame provided with upwardly-extending end projections, J J, provided, respectively, with clips K K, adapted to embrace and thereby fasten the frame H to the axle B at any point on the latter. The frame or head H is also provided with downwardly-extending projections L L, the inner one of which is provided with the horizontal inwardly-projected journal M, which is loosely seated in the box N, suitably fastened on the rail E. In the lower end of the outer arm L there is formed a round transverse hole, O, into which is projected and loosely seated the conforming end or pintle P of the rod F.

The attachment of the arms K of the frame H to the axle B is rigid; but the seating aforesaid of the arms L to said frame is pivotally in the line of the movement of the vehicle. It results, therefore, that the runners C are free to oscillate in a vertical plane.

The interval between the bearings M and O is sufficiently great to prevent the rocking laterally of the body B upon said runner.

As before observed, the frame H can be attached to the axle B at any point upon the latter, and thereby adjust the interval between the runners C to conform to the width of the track upon which the same are intended to be used; or, as is frequently the case, particularly on country roads, the runners can be placed so as to carry the center of the vehicle slightly to one side of the line of the horse's movement.

R R are straps, attached at their lower ends to the forward end of the runners C and at their upper ends to any suitable part of the vehicle to prevent any casual reversing of said runners.

My invention not only affords a cheap mode of converting wheeled vehicles into sleighs or sleds, but my special form of attachment is new and advantageous in being adapted to attach the runners C to the axle B at any point of the latter, and thereby space or vary the tread of the sled or sleigh as may be desired.

The advantage of the ⊥-shaped runner is that it affords the greatest breadth of tread and the greatest strength in a vertical plane in proportion to the quantity of material employed; also, the flange V affords a convenient locality for the attachment of the rod D. The tread S supports the latter endwise and precludes the possibility of said rods projecting below the tread of said runner. The lower surface of the runner C is also a continuous one, unbroken by holes or recesses, as is now common.

What I claim as my invention, and desire to secure by Letters Patent of the United States, is—

1. The combination of the runner C, bench-rods D D, rails E and G, brace-rod F, provided with pintle P, box N, the head H, provided with clips K K, journal M, and opening O, and the axle B, substantially as shown, and for the purpose described.

2. The combination of the runner C, provided with the tread S and central vertical flange, V, bench-rods D D, having their lower ends suitably supported on said tread and attached to said flange, the rail E, supported on said runner and bench-rods, the axle B, and means, substantially as shown, for removably seating said axle on said rail, for the purpose described.

In testimony whereof I affix my signature in presence of two witnesses.

FREDERICK DRIFFILL.

Witnesses:
JOHN G. MANAHAN,
EDGAR G. BAUM.